United States Patent [19]

Staugaard

[11] Patent Number: 4,909,282

[45] Date of Patent: Mar. 20, 1990

[54] PIPE INSULATION, IN PARTICULAR FOR PIPE BENDS AND ELBOWS

[75] Inventor: Arne Staugaard, Roskilde, Denmark

[73] Assignee: Rockwool International A/S, Denmark

[21] Appl. No.: 266,780

[22] Filed: Nov. 3, 1988

[30] Foreign Application Priority Data

Nov. 6, 1987 [DK] Denmark .................. 5834/87

[51] Int. Cl.[4] .................................. F16L 9/22
[52] U.S. Cl. ................................ 138/149; 138/144
[58] Field of Search ............... 138/118, 120, 155, 149, 138/140, 141, 144

[56] References Cited

U.S. PATENT DOCUMENTS

| | | | |
|---|---|---|---|
| 2,089,492 | 8/1937 | Lambert | 138/149 |
| 3,092,529 | 6/1963 | Pearson | 138/149 |
| 3,157,204 | 11/1964 | Phillips | 138/149 |
| 3,216,459 | 11/1965 | Schroeder et al. | 138/149 |
| 3,620,258 | 11/1971 | Graham | 138/149 |
| 3,654,966 | 4/1972 | Waksman | 138/149 |
| 3,995,665 | 12/1976 | Monaghan | 138/149 |
| 4,022,248 | 5/1977 | Hepner et al.1 | 138/141 |
| 4,025,680 | 5/1977 | Botsulas et al. | 138/149 |
| 4,205,105 | 5/1980 | Blundell | 428/36 |
| 4,606,957 | 8/1986 | Cohen | 138/149 |

FOREIGN PATENT DOCUMENTS

| | | | |
|---|---|---|---|
| 200163 | 12/1954 | Australia | 138/149 |
| 517787 | 3/1953 | Belgium | 138/149 |
| 698841 | 10/1940 | Fed. Rep. of Germany | 138/120 |
| 2014555 | 11/1970 | Fed. Rep. of Germany | |
| 2724147 | 12/1978 | Fed. Rep. of Germany | |
| 1072121 | 9/1954 | France | |
| 2378230 | 8/1978 | France | |

Primary Examiner—James E. Bryant, III
Attorney, Agent, or Firm—Ostrolenk, Faber, Gerb & Soffen

[57] ABSTRACT

Pipe insulation comprising a number of substantially identical, annular bodies cut out in the shape of sheets from mineral wool, glass wool or similar fibre materials and having such a fibre structure that their compressibility is biggest in axial direction, the mineral wool bodies being put together around a common axis and wrapped in a resilient, crêpe-structured or pleated sheet material glued to the mineral wool. In order to make possible the bending of the pipe insulation also in the case of the glue being hardened to such an extent that it has become hard and brittle, the glue is applied in the shaped of essentially parallel rows of glue points, the rows running substantially perpendicular to the axis of the insulation and forming between themselves an encircling band of glue-free sheet material.

13 Claims, 2 Drawing Sheets

PIPE INSULATION, IN PARTICULAR FOR PIPE BENDS AND ELBOWS

The compressibility of mineral wool differs with respect to the various directions, which are mainly determined by the collecting conditions during the production of the mineral wool. The fibres of the mineral wool are namely substantially oriented in planes parallel to the sieve band, on which the fibres, air-borne after the suspension, are being deposited. By manufacturing the pipe insulation from annular bodies, the fibres of which are substantially oriented in the plane of the ring, the resilience will substantially be oriented parallel to the axis of the ring, and at the same time the annular bodies will have their biggest resistance to compression in the radial direction. This way of orienting the fibres of the bodies, from which the pipe insulation is made, would make it possible to place the mineral wool insulation as such around pipe bends and elbows, should not, however, the surface coating used for keeping together the cut out, juxtaposed bodies prevent such a bending. As can be seen from SE publication no. 315,776, it has been tried to increase the flexibility by providing the sheet material, which functions as the surface coating, with a pleating or creping running essentially in the peripheral direction of the mineral wool bodies.

In practice, it has, however, turned out that the glue used for joining the mineral wool and the surface coating, shortly or after a little while, hardens to such a degree that the desired bending is not possible, the surface coating having along with the layer of glue become so rigid that the pipe insulation, instead of bending evenly around the pipe, bends in sharp angles in the area, in which the surface coating is bent in the same way as a pipe collapsing when exposed to a too high bending pressure.

The object of the present invention is to provide a pipe insulation, which does not have this drawback. The object is thus to provide a pipe insulation, which even after having been stored for such a long time that the glue has become hard and rigid, will preserve its ability to adapt to the shape of a pipe bend or elbow.

By applying the glue at certain points in substantially parallel rows, the coating can without hindrance be pleated in the interspaces between the stripes of glue, irregardless of the fact that the glue may have hardened so much that it is nearly brittle. Consequently, a great variety of different glues may be used and in so considerable amounts that the glue, when joining the mineral wool bodies with the surface coating, will penetrate between the outer fibres, thus ensuring an effective gluing between the surface coating and the mineral wool in glue points placed in rows.

According to the present invention the glue points may be oblong stripes or they may even be placed with an interspace so small that they run together into coherent stripes.

The same effect is achieved if the rows or stripes run helically around the mineral wool bodies put together. It may, in case only one nozzle is used, be convenient to apply the glue in this way.

In order to achieve an adequately high degree of flexibility it is advantageous that the area of the sheet material covered by the stripes makes up 10-70 per cent of the total area of the sheet material.

An optimum degree of flexibility is achieved when the distance between the centre lines of the stripes of glue is approx. 22.5 mm, the stripes of glue having when applied a width of approx. 1.5 mm and a height of approx. 1 mm. With these dimensions a considerable flexibility of the pipe insulation is combined with an insignificant tendency to pleat the coating.

DETAILED DESCRIPTION OF THE PREFERRED EMBODIMENTS

Figure 1:
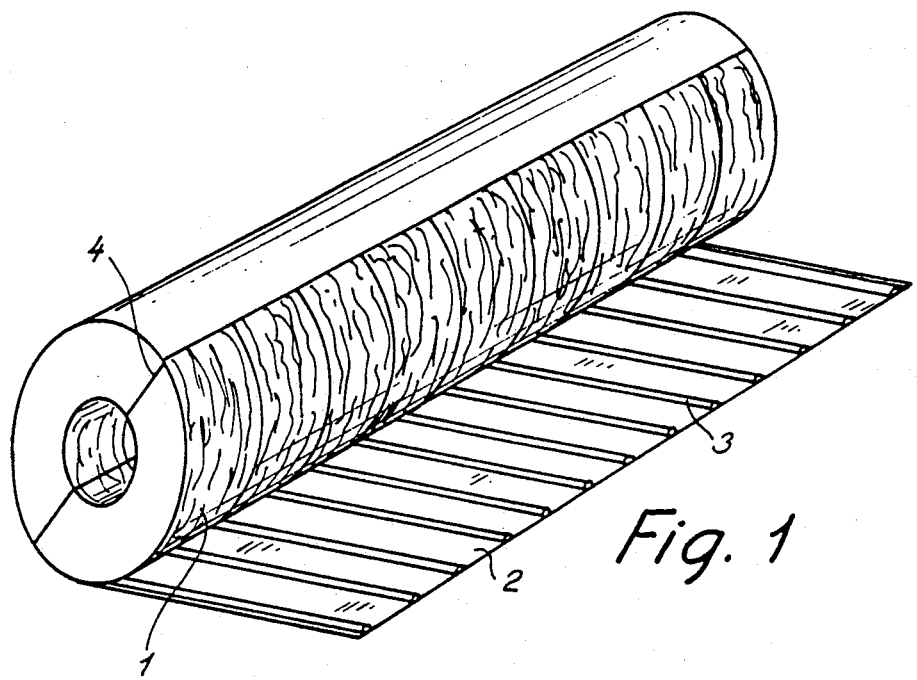
FIG. 1 shows a number of annular bodies put together during the wrapping with the surface coating manufacture of the pipe insulation according to the invention.
Figure 3:
FIG. 3 is an edge-wise view of the wrapping of FIG. 1.

The pipe insulation shown in FIG. 1 comprises a row of bodies 1 put together, said bodies having been cut from mineral wool, glass wool or the like fibre materials, the fibres of which are bound in some of the intersection points by means of a binder, for instance phenol resin, into a coherent, semi-rigid felt. The bodies 1 have been cut out from a sheet of the fibre material in such a way that the fibre felt has its biggest flexibility in the axial direction of the rings and its biggest rigidity in the radial direction of the rings. The bodies are put together with a common axis and close to each other over a length of for instance 100 cm and are then provided with a surface coating 2 in the shape of a sheet material, for instance paper. It is advantageous that the paper has been pre-treated in such a way that it has a considerable flexibility in the axial direction of the bodies put together, but this pre-treatment should not, however, provide the sheet material with such an increased rigidity perpendicular to this axis that it would not be possible to wrap it around the juxtaposed bodies 1. As an example of such pre-treatment creping or certain types of pleating (FIG. 3) may be mentioned. Other types of sheet materials than paper may, however, also be used. Woven or non-woven textiles provided with a coating or with a foil of plastic or metal may be used. Suitable materials may be bitumencoated paper of crepe-structure and not-reinforced aluraft. Before being wrapped around the juxtaposed mineral wool bodies 1 the sheet material is provided with a row of small stripes of glue being able to secure the sheet material to the mineral wool. The glue is to be of the hot-melt type or a soluble or aqueous glue. The glue has to have a consistency enabling it to penetrate to some extent into the mineral wool, but it should only to a slight extent spread into the interspace between the sheet material and mineral wool, in which way the stripes of glue will not become essentially wider than when applied. When the sheet material is wrapped around the mineral wool bodies put together, the glue areas are to form small stripes making out 10-70 per cent of the total area of the sheet material. Various tests with different distances between the stripes of glue have shown that the optimum flexibility is achieved by means of an interspace between the centre lines of the stripes of glue of approx. 22.5 mm, the stripes of glue consisting of a hot-melt being applied with a width of approx. 1.5 mm and a height of approx. 1 mm.

Instead of coherent stripes the glue may also be applied as rows of points or possibly rows of subsequent short stripes. The use of points instead of stripes gives the wrapping a bigger flexibility when being bent around the mineral wool bodies and also makes the finished pipe insulation more smooth and flexible. On the other hand it is possible, with a glue hardening after the lapse of a certain amount of time into a hard and comparatively vicious material when applied in coherent stripes, to obtain a system of strengthening rings around the mineral wool, the pipe insulation thus being provided with increased resistance towards damage after having been mounted.

The annular mineral wool bodies 1 may in a conventional way, before being provided with the wrapping 2 or after the wrapping has been put into place, be provided with cuttings, which makes it possible to open the pipe insulation for being placed around a pipe.

Figure 2:
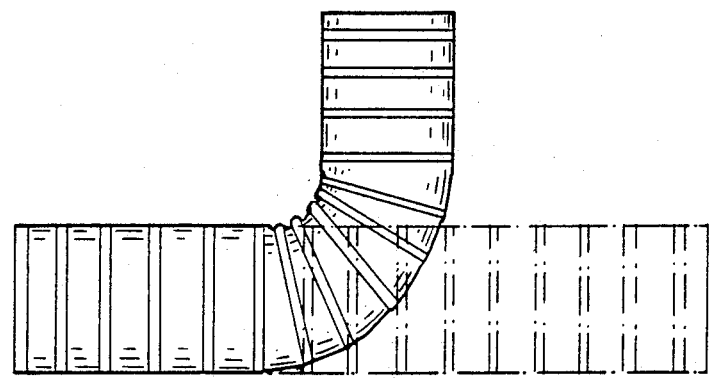
FIG. 2 shows the bending of the pipe insulation according to the invention.

On account of the interspaced stripes of glue it is possible also to place the pipe insulation around a bent pipe like shown in FIG. 2. Even though the glue after some time of storing of the insulation has become completely hard and brittle, it will be possible to bend the element, the glue forming rings with a mutual interspace along the pipe insulation. The glue-free and thus flexible sheet material in the coating between the stripes of glue or the rows of glue points may be pleated in the areas in between, the insulation being then flexible when compressing the mineral wool rings along the inside of the bending. In FIG. 2 the pipe insulation is shown with dot-and-dash line before the bending and with full-drawn lines after the bending.

Figure 4:
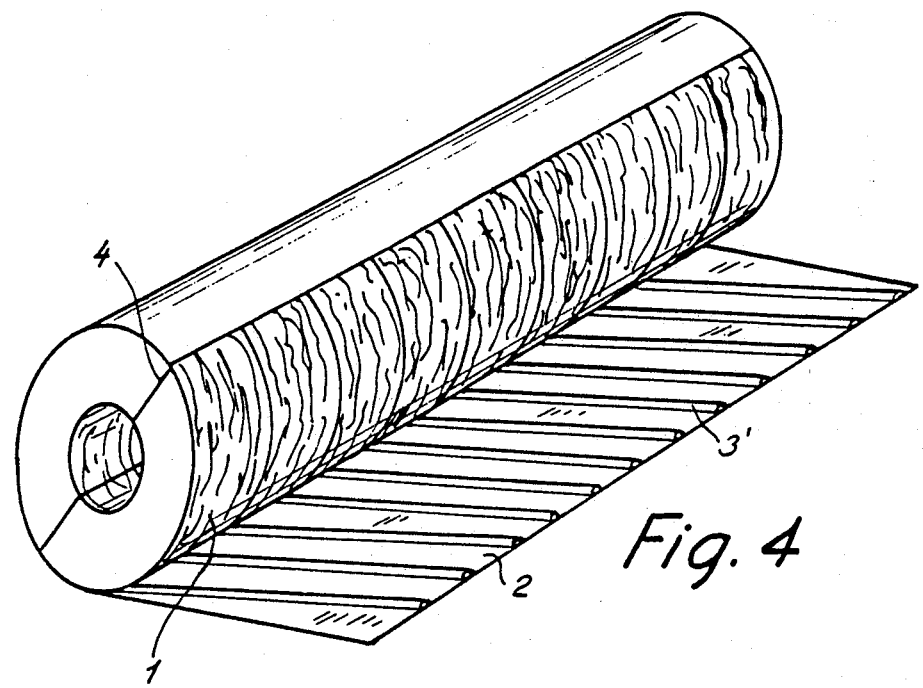
FIG. 4 illustrates an alternative embodiment of the invention.

Instead of applying the glue in a row of parallel running stripes, perpendicular to the axis of the juxtaposed mineral wool bodies, the glue may be applied in such a way that it runs helically (3; FIG. 4) around the pipe insulation without affecting the flexibility of the insulation.

We claim:

1. Pipe insulation comprising a number of substantially identical, sheet-like annular bodies cut out from mineral wool, glass wool or similar fibre materials, the annular bodies defining a common axis, the annular bodies having such a fibre structure that their compressibility is greater along a direction parallel to the axis than in a direction perpendicular to the axis, said bodies being put together around the common axis and wrapped in a sheet material, the sheet material having a resilient, crepe or pleated structure, the sheet material being glued to the annular bodies, wherein the glue is applied in the shape of essentially parallel rows of glue points, the rows running substantially perpendicular to the axis, the sheet material including an encircling band of glue-free sheet material between the rows.

2. Pipe insulation according to claim 1, characterized in that the glue points are oblong stripes.

3. Pipe insulation according to claim 1, characterized in that the glue points are placed so close to one another that essentially they converge into unbroken stripes.

4. Pipe insulation according to claim 2, characterized in that the area of the sheet material covered by the stripes makes up 10–70 per cent of the total area of the sheet material.

5. Pipe insulation according to claim 3, characterized in that the distance between the centre lines of the stripes of glue is about 22.5 cm, the stripes having when applied a width of approx. 1.5 cm and a height of approx. 1 mm.

6. Pipe insulation according to claim 2, characterized in that the glue points are placed so close to one another than essentially they converge into unbroken stripes.

7. Pipe insulation according to claim 3, characterized in that the area of the sheet material covered by the stripes makes up 10–70 per cent of the total area of the sheet metal.

8. Pipe insulation according to claim 4, characterized in that the distance between the centre lines of the stripes of glue is about 22.5 cm, the stripes having when applied a width of approximately 1.5 cm and a height of approximately 1 mm.

9. Pipe insulation comprising a number of substantially identical, sheet-like annular bodies cut out from mineral wool, glass wool or similar fibre materials, the annular bodies defining a common axis, the annular bodies having such a fibre structure that their compressibility is greater along a direction parallel to the axis than in a direction perpendicular to the axis, the bodies being put together around the common axis and wrapped in a sheet material, the sheet material having a resilient, crepe or pleated structure, the sheet material being glued to the annular bodies, wherein the glue is applied in the shape of essentially parallel rows of glue points, the sheet material including an encircling band of glue-free sheet material between the rows, wherein the rows of glue points run helically around the insulation.

10. Pipe insulation according to claim 9, characterized in that the area of the sheet material covered by the stripes makes up 10–70 per cent of the total area of the sheet metal.

11. Pipe insulation according to claim 9, characterized in that the distance between the centre lines of the stripes of glue is about 22.5 cm, the stripes having when applied a width of approximately 1.5 cm and a height of approximately 1 mm.

12. Pipe insulation according to claim 9, wherein the glue points are oblong stripes.

13. Pipe insulation according to claim 9, wherein the glue points are placed so close to one another that essentially they converge into unbroken stripes.

* * * * *